US009933791B2

(12) United States Patent
Lucas et al.

(10) Patent No.: US 9,933,791 B2
(45) Date of Patent: Apr. 3, 2018

(54) TANK FLUID LEVEL MANAGEMENT (71) Applicant: HALLIBURTON ENERGY SERVICES, INC., Houston, TX (US)

(72) Inventors: Bryan C. Lucas, Duncan, OK (US); James R. Troutman, Duncan, OK (US); Mehdi Mazrooee, Double Oak, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 13 days.

(21) Appl. No.: 15/038,417

(22) PCT Filed: Dec. 20, 2013

(86) PCT No.: PCT/US2013/076868
§ 371 (c)(1),
(2) Date: May 20, 2016

(87) PCT Pub. No.: WO2015/094327
PCT Pub. Date: Jun. 25, 2015

(65) Prior Publication Data
US 2016/0291609 A1    Oct. 6, 2016

(51) Int. Cl.
*E03B 1/00* (2006.01)
*G05D 9/12* (2006.01)
(Continued)

(52) U.S. Cl.
CPC ............... *G05D 9/12* (2013.01); *C09K 8/62* (2013.01); *E21B 43/26* (2013.01); *E21B 21/062* (2013.01);
(Continued)

(58) Field of Classification Search
CPC ......... Y10T 137/0324; Y10T 137/0396; Y10T 137/0374; Y10T 137/7303;
(Continued)

(56) References Cited

U.S. PATENT DOCUMENTS 4,265,262 A * 5/1981 Hotine .................. G01F 23/242
137/2
4,716,932 A    1/1988 Adams, Jr.
(Continued)

OTHER PUBLICATIONS

International Search Report and Written Opinion, dated May 5, 2014, 7 pages, United States Patent and Trademark Office.

*Primary Examiner* — Craig J Price (57) ABSTRACT

A pumping system and method for blending hydraulic fracturing fluids includes a liquid additive holding tank having an outlet at a bottom of the holding tank, a first sensor at a first location in the holding tank adjacent a lower portion of the holding tank, and a second sensor at a second location in the holding tank above the first location. The pumping system further includes a liquid additive pump to deliver fluid gravity fed from the outlet of the holding tank, a chemical transfer pump to pump fluid into the holding tank in response to receiving a first signal that a fluid level of the holding tank is below the first sensor and cease to pump fluid into the holding tank in response to receiving a second signal from the second sensor indicating the fluid level is above the second sensor.

18 Claims, 7 Drawing Sheets (51) Int. Cl.
*C09K 8/62* (2006.01)
*E21B 43/26* (2006.01)
*E21B 21/06* (2006.01)

(52) U.S. Cl.
CPC .... *Y10T 137/0318* (2015.04); *Y10T 137/8342* (2015.04); *Y10T 137/86131* (2015.04)

(58) Field of Classification Search
CPC ......... Y10T 137/8326; Y10T 137/8342; Y10T 137/8593–137/86179; G05D 9/12; C09K 8/62; E21B 43/26; E21B 21/062
USPC ......... 137/391, 558, 560–565.36, 1–14, 256; 166/308.1
See application file for complete search history.

(56) References Cited

U.S. PATENT DOCUMENTS

| 6,612,812 B1 | 9/2003 | Gard |
| 2007/0137862 A1 | 6/2007 | Stephenson et al. |
| 2007/0166169 A1 | 7/2007 | Venkatachari et al. |
| 2008/0236818 A1 | 10/2008 | Dykstra |
| 2010/0215511 A1 | 8/2010 | Eller et al. |
| 2011/0061415 A1 | 3/2011 | Ward |

\* cited by examiner

TANK FLUID LEVEL MANAGEMENT

The present application is a U.S. National Stage patent application of International Patent Application No. PCT/US13/76868, filed on Dec. 20, 2013, the benefit of which is claimed and the disclosure of which is incorporated herein by reference in its entirety.

FIELD OF THE INVENTION

This disclosure relates, in general, to equipment utilized in conjunction with hydraulic fracturing operations in the oil and gas industry, and, in particular, to fracturing fluid management.

BACKGROUND

Without limiting the scope of the present disclosure, its background is described with reference to managing fluid levels within a holding tank used to hold chemical additives for hydraulic fracturing fluid.

During hydraulic fracturing operations, formation rock around a wellbore may be broken up with pressurized fluid to enhance hydrocarbon recovery. As this pressurized fluid is pumped down a well to the location where the fracturing is to occur, various liquid additives may be mixed with that fluid. The liquid additives are typically brought onsite in a tote, such as a portable container on a vehicle, to hold the liquid additives. A chemical transfer pump is then used to pump those chemicals into one or more holding tanks typically located on a skid or truck mounted blender system.

The holding tank typically is in fluid communication with a blender, where the liquid additive is mixed with other components of a hydraulic fracturing fluid. In some configurations, the liquid additive is gravity fed from the bottom of the holding tank to a liquid additive pump that in turn pumps the liquid additive to the blender. During blending operations, the level of the liquid additive within the holding tank will constantly rise and fall as the tank is drained by virtue of the liquid additive pump and replenished by virtue of the chemical transfer pump. In order to ensure that holding tank maintains a continuous supply of liquid additive to the liquid additive pump so as not to cause the liquid additive pump to operate dry, the chemical transfer pump should maintain a minimum supply of liquid additives in the holding tank during blending operations.

Additionally, it is desirable that the holding tank not overflow. During hydraulic fracturing operations, it is possible that an operator of the chemical transfer pump can get distracted by one of the many tasks that have to be performed. If the chemical transfer pump is left off for too long, the holding tank may run dry, potentially causing damage to the liquid additive pump. Conversely, if the chemical transfer pump is left on for too long, the holding tank could overflow, leading to a potential safety hazard.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DESCRIPTION OF ILLUSTRATIVE EMBODIMENTS

Figure 1:
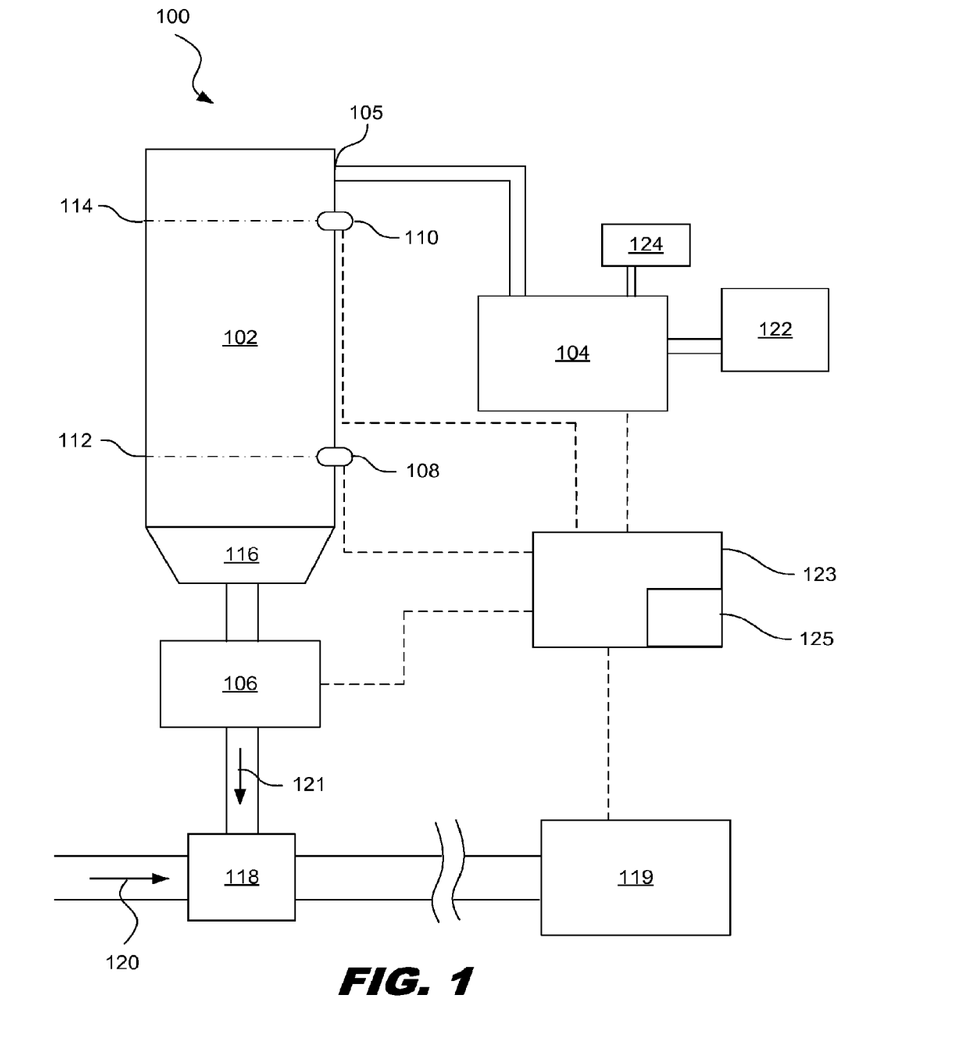
FIG. 1 is a diagram showing an illustrative pumping system with fluid level management according to an example or principles described herein.

FIG. 1 illustrates a pumping system 100 with fluid level management. According to some embodiments, the pumping system 100 includes a chemical transfer pump 104, a holding tank 102, and a liquid additive pump 106. The following describes these components in further detail.

The chemical transfer pump 104 is used to pump fluid from a tote 122 to the holding tank 102. As described above, a tote 122 may be a portable container that is temporarily placed onsite during the hydraulic fracturing operation or tote 122 may be another storage container located on site. For example, tote 122 may be carried on a vehicle and moved to the desired location.

In one embodiment, a solenoid valve 124 may be used to turn the chemical transfer pump 104 on or off. The solenoid valve may be placed between the motor that drives the chemical transfer pump and the source of power to the chemical transfer motor (not shown) that drives the chemical transfer pump 104. The solenoid valve 124 is used to direct power to and away from the motor of the chemical transfer pump 104 in response to signals received, as will be described in further detail below. Specifically, when turned on, the chemical transfer pump 104 will pump the liquid additives from the tote 122 into the holding tank 102. When turned off, the chemical transfer pump 104 will cease pumping fluid.

The holding tank 102 includes a first sensor 108 at a first level 112 and a second sensor 110 at a second level 114. The holding tank 102 also includes an inlet 105 in fluid communication with the chemical transfer pump 104 and an outlet 116 positioned adjacent the bottom of tank 102. Fluid within the holding tank 102 is gravity fed out of the holding tank 102 through outlet 116.

The first sensor 108 is placed near the bottom of the holding tank 102, at a distance spaced above outlet 116 so that a minimum volume is defined in holding tank 102 between first sensor 108 and outlet 116. As described above, it is desirable that the holding tank 102 maintain at least a minimum volume of fluid therein during operation of liquid additive pump 106 to avoid damage to pump 106.

In this regard, in some embodiments, the first sensor 108 may be placed at a level 112 that corresponds with the holding tank 102 being within a range of about 5 to 40 percent full. For example, a 40 gallon tank may have the first sensor 108 placed at a level 112 that corresponds to having 3 gallons remaining inside tank 102. This corresponds to the 40 gallon tank being 7.5 percent full.

The second sensor 110 is preferably positioned at a level 114 that is sufficiently below the top of tank to minimize the likelihood of overflow of holding tank 102. In this regard, in some embodiments, the second sensor 110 may be placed at a level 114 that corresponds with the holding tank 102 being within a range of 70 to 95 percent full. For example, a 40 gallon tank may have the second sensor 110 placed at a level 114 that corresponds to having 37 gallons inside tank 102. This corresponds to the 40 gallon tank being 92.5 percent full.

Both the first sensor 108 and the second sensor 110 may be any type of sensor that detects when the fluid level of the tank passes the corresponding level. Without limiting the foregoing, in some embodiments, one or both of the sensors 108, 110 are frequency sensors. Frequency sensors utilize an oscillating electric current. When that current is disrupted by something, in this case, liquid in the tank, the signal changes which indicates that the liquid in the tank has passed the sensor. In other embodiments, one or both of the sensors 108, 110 are pressure sensors that detect pressure from liquid at the level at which the sensors 108, 110 are placed.

To the extent mounted within tank 102, one or both of sensors 108, 110 are preferably disposed on the interior wall of tank 102 so as to be low profile, with minimal protrusion into the interior cavity of tank 102. In other embodiments, one or both sensors 108, 110 may be mounted on the exterior of the holding tank 102. The sensing mechanisms of the sensors may protrude through the wall of the holding tank 102. Any aperture in the wall of holding tank 102 through which the sensing mechanisms are mounted are appropriately sealed to prevent fluid leakage.

In some cases, the holding tank 102 may have a metal screen (not shown) placed at the bottom to prevent debris from entering outlet port 116.

According to some embodiments, the liquid additive pump 106 is used to pump liquid additive 121 from the holding tank 102 into a blending apparatus 118 where the liquid additive is mixed with one or more other fracturing fluid components 120. The fracturing fluid component 120, after being mixed with the liquid additive 121, may then be delivered to a fracturing tool 119 and used to perform the hydraulic fracturing operations.

According to some embodiments, the pump system 100 described herein may be operated by a control system 123. The control system 123, described in more detail below, can be configured to monitor levels 112, 114 in tank 102 via sensors 108, 110 and turn on and off pumps 104, 106 in to ensure that the fluid level within tank 102 preferably remains between first level 112. In certain embodiments, control system 123 includes a timing device 125, such as, for example a clock or other time tracking system.

Figure 2A:
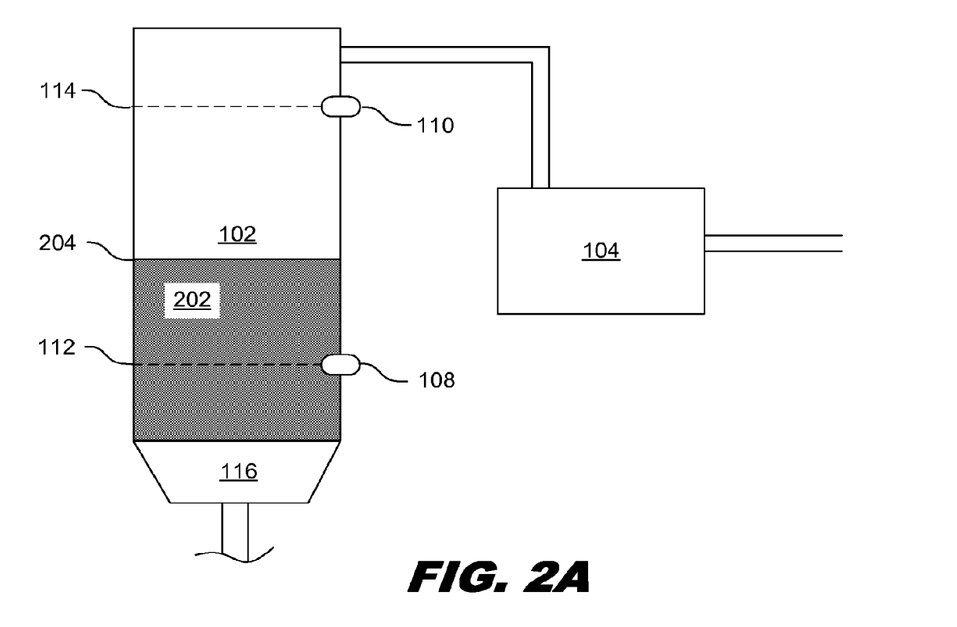
FIGS. 2A-2C is a diagram showing a holding tank with the volume of fluid within at varying levels according to an example of principles described herein.
Figure 2B:
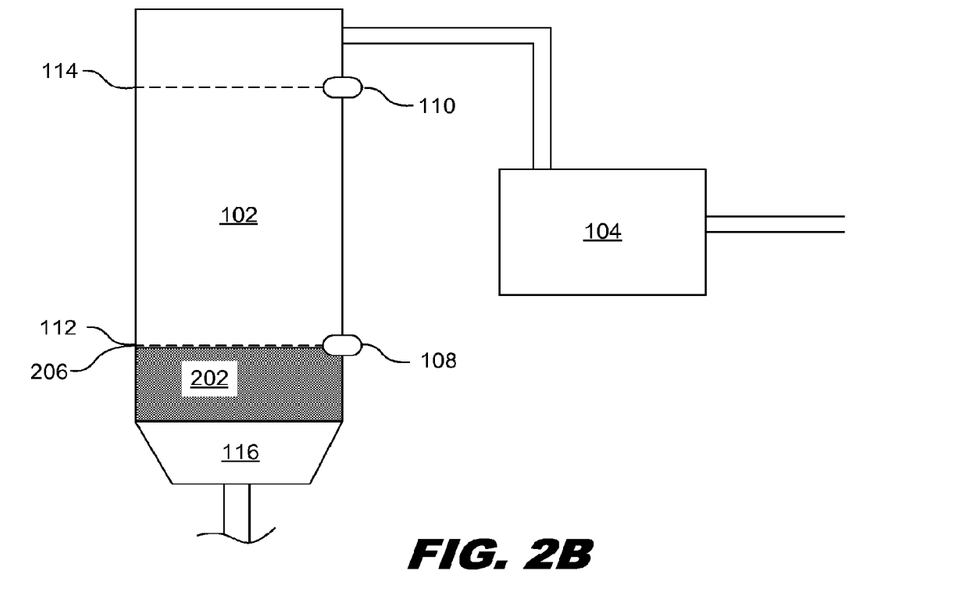
Figure 2C:
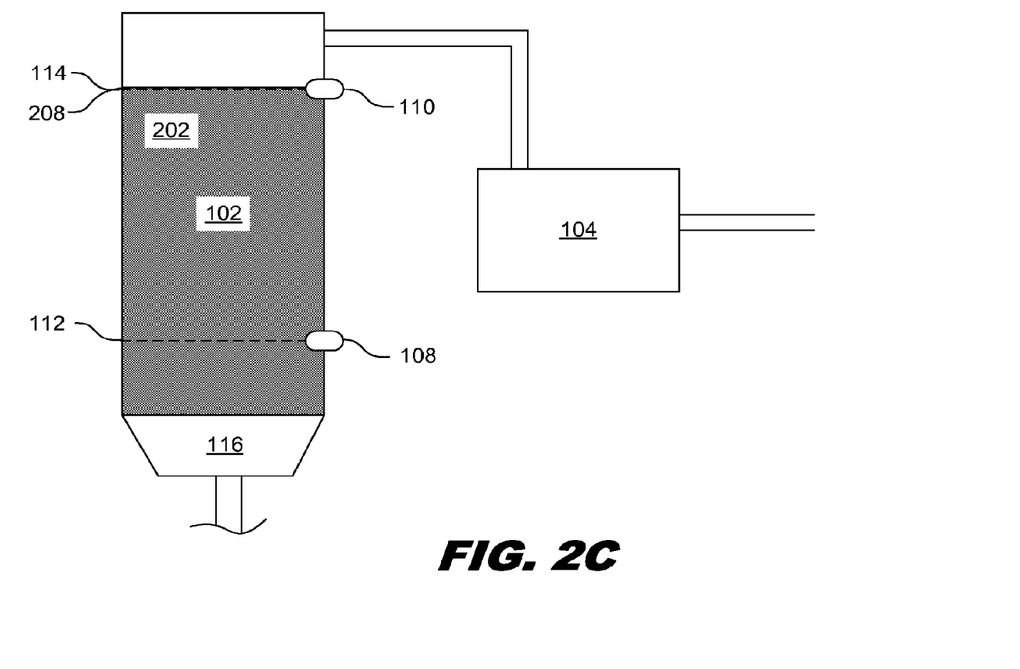

FIGS. 2A-2C illustrate holding tank 102 with the volume of fluid within at varying levels. FIG. 2A illustrates the pumping system (100, FIG. 1) with a fluid at an intermediate level, such as before the liquid additive pump (106, FIG. 1) is turned on or during pump down of holding tank 102. According to some embodiments, before the liquid additive pump is turned on, the holding tank 102 may be filled with fluid 202 to some intermediate level 204 between the first level 112 and the second level 114. This ensures that there is enough fluid 202 in the holding tank 102 so that when the liquid additive pump (106, FIG. 1) is turned on, it will have sufficient fluid provided thereto to ensure that pump 106 is not operating without fluid.

FIG. 2B illustrates pumping system as the fluid level 206 drops below the first sensor 108. After the liquid additive pump (106, FIG. 1) is turned on, the fluid 202 within the holding tank 102 is gravity fed through outlet 116 and out of the holding tank 102, thus draining the holding tank 102.

When the fluid level 206 passes the first level 112, the first sensor 108 will detect as much and can then send a signal that will result in activation of the chemical transfer pump 104, refilling tank 102. The fluid level 206 of the holding tank 102 will then begin to rise.

Figure 3:
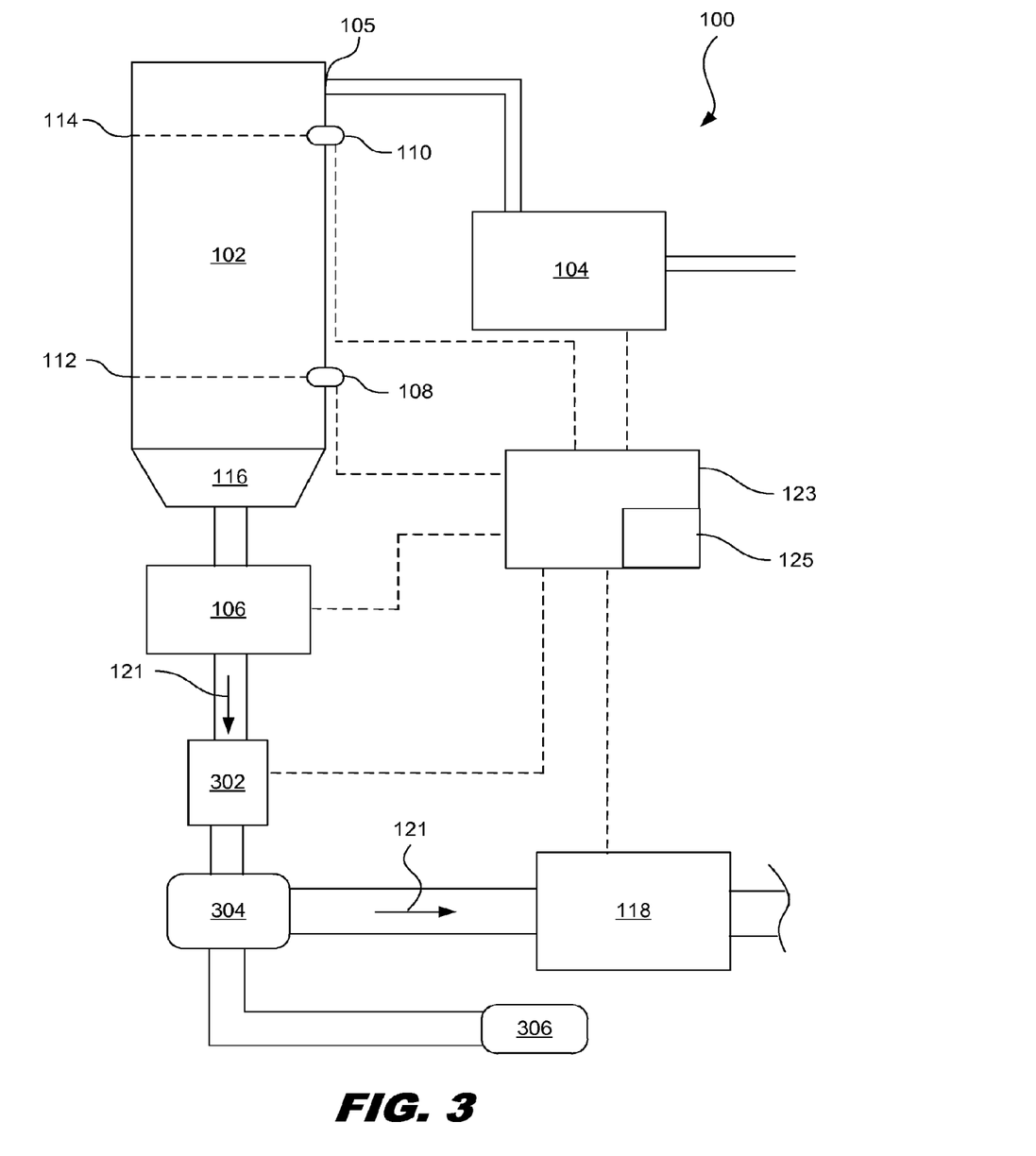
FIG. 3 is a diagram showing an illustrative pumping system having a flow meter according to an example of principles described herein.

FIG. 2C illustrates is a diagram showing the pumping system as the fluid level 208 rises above the second sensor 110. After the chemical transfer pump 104 is switched on, the fluid level 208 will rise until it passes the second level 114. At that point, the second sensor 110 will detect the fluid 202. The second sensor 110 can then send a signal that will result in deactivation of the chemical transfer pump 104. Thus, the fluid level 208 will cease to rise and begin to drop as the fluid 202 is gravity fed out of the holding tank 104. As will be appreciated by persons of skill in the art, during operation FIG. 3 illustrates pumping system 100 having a flow meter 302. According to some embodiments, the pumping system 100 includes a flow meter 302 positioned between the liquid additive pump 106 and the blending apparatus 118. The flow meter 302 controls the speed at which liquid additive pump 106 operates by measuring the rate at which liquid additives from the holding tank 102 are fed into blending apparatus 118. For various reasons, the accuracy of the flow meter may degrade over time. Since flow meter 302 controls liquid additive pump 106 and hence, flow of liquid additives introduced into blending apparatus 118, it is desirable to monitor the accuracy of flow meter 302 during mixing operations. Using the pumping system embodying principles described herein, the accuracy of the flow meter can be validated.

The levels 112, 114 at which the sensors 108, 110 are placed can be known, as are the dimensions of tank 102. Thus, regardless of the shape of tank 102, the volume of tank 102 between the two sensors 108, 110 is known. For example, if the holding tank 102 is a 40 gallon tank and the first level 112 is at the 7 gallon level and the second level 113 is at the 37 gallon level, then it is known that the volume between the two levels 112, 114 is 30 gallons. It will be understood by persons of skill in the art that while a round tank is illustrated, the disclosure herein is not intended to be limited by tank shape.

To evaluate accurate operation of the flow meter, after the chemical transfer pump 104 is turned off, control system 123 initiates operation of timing device 125 once the fluid level falls below the second level 114 as determined by the second sensor 110. The timing device 125 is stopped when the fluid level falls below the first level 112. The flow rate can then be determined, such as by control system 123, by dividing the known amount of volume between the two levels 112, 114 by the time as measured by the timing device 125. For example, if it takes one minute to drain the tank from the second level 114 to the first level 112, and the volume between the two levels 112, 114 is 30 gallons, then the flow rate is 30 gallons per minute.

The flow rate can be determined in this manner because all fluid being drained from the holding tank 102 is fed through the liquid additive pump 106 and through the flow meter 302. If the flow meter 302 reports a flow rate that is different from the flow rate calculated in the manner described above, then it can be determined that the accuracy of the flow meter 302 has drifted and that the flow meter 302 should be re-calibrated.

Validating the flow meter 302 in this manner is preferable over conventional methods. Conventional methods of validating a flow meter 302 involve a bucket test. A bucket test is typically performed using a small bucket such as a 5 gallon bucket. Fluid from the liquid additive pump 106 can be routed through a manifold 304, through a discharge line 306, and to the 5 gallon bucket (not shown). Thus, instead of directing a liquid additive to a blending apparatus 118, the liquid additive is directed to the bucket through the discharge line 306. The amount of time required to fill the 5 gallon bucket is then used to determine the flow rate. Such a system itself is prone to inaccuracies because time is measured for a smaller volume. Thus, any small discrepancy between the measured and actual time required to fill the bucket can have a large effect on the calculated flow rate. Additionally, it will be appreciated that during such bucket tests, operation of the blending apparatus 118 must be suspended, thereby delaying production of hydraulic fracturing fluids. Using principles described herein, however, will allow a bucket test to be performed in real time, on-the-fly without suspending operations.

In some embodiments, the sensors 108, 110 may also be used to determine a specific volume of fluid contained within the tank. For example, after the chemical transfer pump 104 is deactivated and the fluid begins to drain from tank 102 through outlet 116, control system 123 can activate a timing device 125. The current volume can then be determined by multiplying the elapsed time timing device 125 by the flow rate as measured by the flow meter 302. This yields the amount of fluid drained from the holding tank 102 during the measured time interval. The volume of fluid drained from the holding tank 102 can then be subtracted from the known volume at the second level 114. This provides the current volume within the holding tank 102. For example, if the amount of elapsed time multiplied by the flow rate is 14 gallons, and the second level 114 is at the 37 gallon mark, then the current volume within the tank is 23 gallons. The current volume can be displayed to an operator, if desired.

In some embodiments, the sensors 108, 110 can also be used to determine a specific volume of fluid in the holding tank as the fluid level is increasing if the flow rate of the chemical transfer pump 104 is known. Specifically, control system 123 can activate a timing device 125 when the chemical transfer pump 104 is activated in response to the fluid level rising above the first level. The time increment since the timing device 125 start can be multiplied by the flow rate of fluid being pumped into the holding tank 102. This value is then added to the known volume at the first level 112. For example, if multiplying the time increment and the flow rate of the chemical transfer pump 104 indicates 21 gallons have been pumped, and the first level 112 is at the 7 gallon mark, then the volume of fluid in the tank at the end of the time increment is 28 gallons. This method can also be used to measure the volume of fluid in the holding tank 102 as the fluid level is decreasing. For example, the timing device 125 is activated when the fluid level falls below the second level 114. The volume of fluid in the holding tank 102 is then determined by subtracting the flow-rate multiplied by the time interval measured by the timing device from the known volume of the tank at the second level 114.

Figure 4:
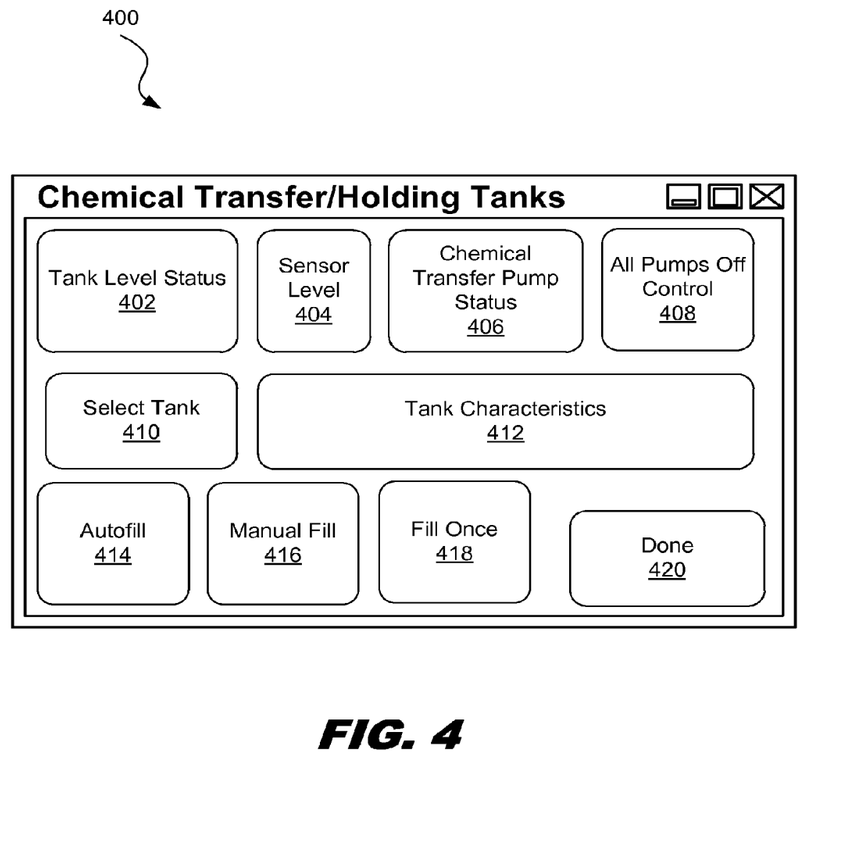
FIG. 4 is a diagram showing an illustrative graphical user interface for managing the fluid level within a tank according to an example of principles described herein.

FIG. 4 illustrates a graphical user interface (GUI) 400 for managing the fluid level within a holding tank (102, FIG. 1). According to some embodiments, the GUI 400 may be part of the control system 123. The GUI 400 may include several features with which a user or operator may interact.

The GUI 400 may include a tank level status feature 402. The tank level status feature 402 can display the status of the fluid level of the holding tank. The fluid level status may be displayed graphically, numerically, or both.

The GUI 400 may include a sensor level feature 404. The sensor level feature 404 may display the levels (112, 114, FIG. 1) at which the sensors (1-8, 110, FIG. 1) within the holding tank 102 are placed. The sensor levels may be displayed graphically, numerically, or both. The sensor level feature 404 may also include a mechanism to allow a user to input sensor levels. For example, if a new holding tank is connected to the control system, a user may have to manually input the levels at which the sensors are placed.

The GUI 400 may include a chemical transfer pump status feature 406. The chemical transfer pump status feature 406 may indicate whether the chemical transfer pump (104, FIG. 1) is on or off. This may be displayed through either graphics or text. The chemical transfer pump status feature 406 may also include a mechanism to allow a user to manually change the status of the chemical transfer pump.

The GUI 400 may include an all pumps off control feature 408. In some cases, multiple holding tanks and multiple chemical transfer pumps may be connected to a control system. The all pumps off control feature 408 may allow a user to simultaneously turn off all pumps. This may be useful in certain situations, such as emergency situations.

The GUI 400 may include a select tank feature 410. Because the control system may be connected to multiple holding tanks and multiple chemical transfer pumps, a user may be allowed to use the select tank feature 410 to switch between the multiple holding tanks. The user can then view the various statuses and characteristics of individual holding tanks and corresponding chemical transfer pumps.

The GUI 400 may include a tank characteristics feature 412. The tank characteristics feature may display various characteristics of the holding tank. Such characteristics include, for example, a capacity of the holding tank, the type of fluid in the tank, the time passed since the tank was cleaned. Other characteristics may be displayed as well.

The GUI 400 may include an auto-fill feature 414. When the auto-fill feature 414 is selected, the holding tank will automatically be filled and drained as the chemical transfer pump turns off and on in the manner described above. The GUI 400 may also include a manual fill feature 416. When selected, the manual fill feature 416 allows an operator to manually turn the chemical transfer pump on and off.

The GUI 400 may include a fill once feature 418. The fill once feature 418 allows an operator to fill the holding tank once. In this mode, the chemical transfer pump will turn on until the fluid level reaches the second level of the second sensor. At this point, the chemical transfer pump turns off. The operator will then have to manually turn on the chemical transfer pump if the fluid level in the holding tank gets too low.

The GUI 400 illustrated in FIG. 4 and described herein is merely one example and is used for illustrative purposes. Various other types of GUI arrangements are contemplated. For example, the GUI may be part of software designed to operate on a laptop or tablet computing system. Alternatively, the GUI may be presented to a user as a touchscreen integrated with either the chemical transfer pump or the holding tank.

Figure 5:
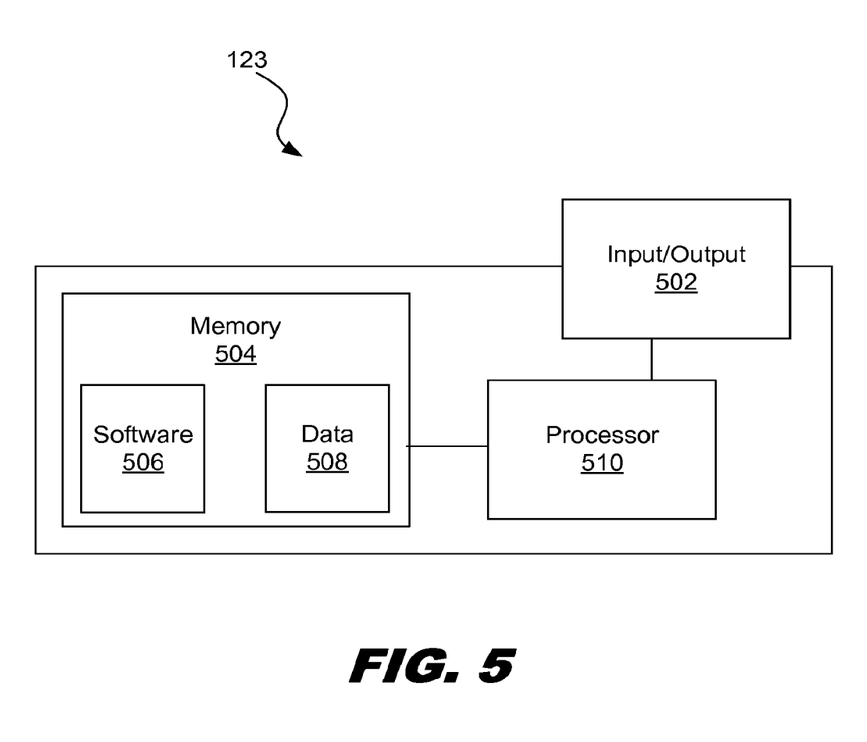
FIG. 5 is a diagram showing an illustrative control system that can be used for fluid level management according to an example of principles described herein.

FIG. 5 illustrates an embodiment of control system 123 that can be used for fluid level management in a hydraulic fracturing fluid blender system. The control system 123 includes a memory 504 which may include software 506 and a data store 508. The control system 123 also includes a processor 510 and an Input/Output (I/O) port 502.

The memory 504 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 506 and data 508.

The control system 123 also includes a processor 510 for executing the software 506 and using or updating the data 508 stored in memory 504. The software 506 may include instructions for receiving and processing signals from the sensors (108, 110, FIG. 1). The software 506 may further include instructions for sending control signals to the chemical transfer pump (104, FIG. 1) in response to signals received from the sensing mechanism.

The control system 123 may be housed within a separate device that is in electrical connection with both the sensors of the holding tank (102, FIG. 1) and the chemical transfer pump. In some examples, the control system 123 may be part of, or integrated with, the chemical transfer pump. In some examples, the control system may be part of, or integrated with, either the holding tank or the liquid additive pump (106, FIG. 1).

Figure 6:
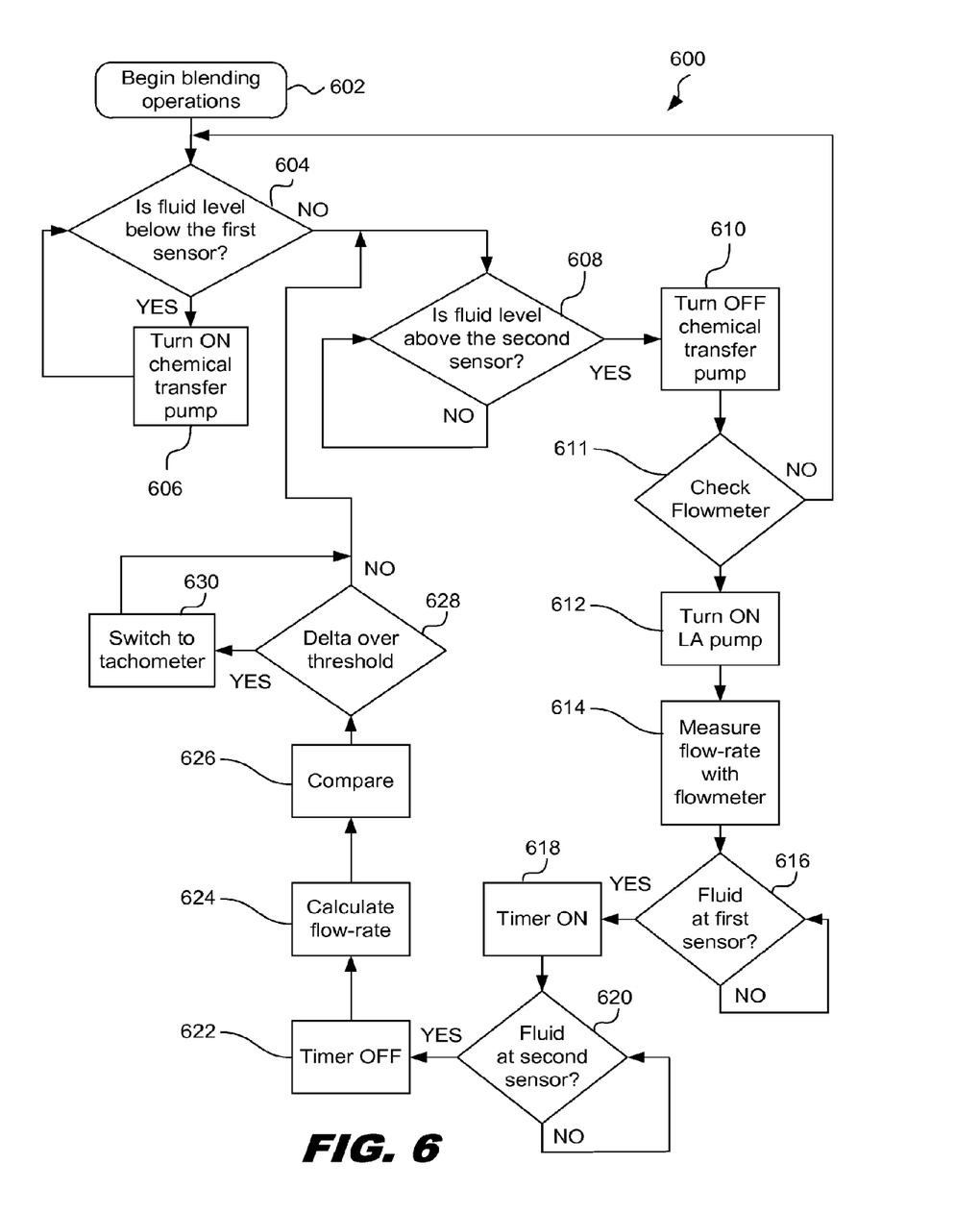
FIG. 6 is a flowchart showing an illustrative method for fluid level management according to an example of principles described herein.

FIG. 6 is a flowchart showing an illustrative method 600 for fluid level management in a hydraulic fracturing fluid blender system. According to some embodiments, the method 600 starts at step 602 by beginning blender operations. Step 602 preferably includes making an initial determination about the level of liquid additive within liquid additive tanks utilized by the blender system. Thus, at step At step 604, a determination is made about the level of liquid additive within the liquid additive tanks utilized by the blender system. Specifically, it is determined whether the fluid level of the holding tank is below the first sensor at the first level. If the fluid level is below the first level, and the system is in "autofill" mode, then the chemical transfer pump is turned on. The chemical transfer pump may generally pump fluid into the holding tank at a faster rate than it is drained by the liquid additive pump. Thus, the fluid level within the tank will begin to rise.

If it is determined that the fluid level is not below the first level, then the method 600 proceeds to step 608. At step 608, it is determined whether the fluid level is above the second level measured by the second sensor. If the fluid level is below the second level sensor, the chemical transfer pump is allowed to continue to operate.

If, however, it is determined that the fluid level is above the second level associated with the second sensor, then the chemical transfer pump is turned off at step 610. Persons of skill in the art will appreciate that even after the fluid level is determined to be above the second level, the chemical transfer pump may be allowed to operate for a period of time, resulting in a volume of fluid in the tank above the second sensor but below the top of the tank. In any event, the method then proceeds back to step 604 and the monitoring of the fluid level within tank continues during the blending operations. Because the chemical transfer pump is turned off and the liquid additive pump is still turned on, the fluid level within the holding tank will begin to drop. Thus, the method 600 operates continuously throughout the hydraulic fracturing fluid blending process until the entire pump system is turned off.

Notwithstanding the general monitoring and control of the fluid level within liquid additive tank 102, on certain embodiments of the invention, as illustrated as beginning at step 611, a method may be employed in conjunction therewith to monitor and adjust, as necessary, the flow rate of liquid additives being delivered to a blending device. In a step 612, delivery is initiated of a liquid additive from a liquid additive tank to a blending device by turning on a liquid additive pump. Of course, as described above, the liquid additive pump will only be activated if the liquid level in the liquid additive tank is above the first sensor. In any event, preferably, the liquid additive is gravity fed from the tank to the liquid additive pump. The liquid additive pump is operated at a predetermined speed based on the desired delivery rate of the liquid additive to the blending device. A flowmeter monitors the liquid additive flowrate from the liquid additive pump and controls the speed of the liquid additive pump according to the predetermined speed. Thus, at step 614, once the liquid additive pump begins to operate, the flowmeter measures the flow rate of liquid additive delivered from the liquid additive pump to the blending device. It will be appreciated by persons of skill in the art that while the term "blending device" is utilized herein, other types of equipment utilizing fluids in hydrocarbon drilling and production operations may also be used in conjunction with the systems and methods described herein.

As described above, the flow rate of the chemical transfer pump pumping liquid additive into the tank is greater than the flow rate of liquid additive pump pumping liquid additive out of the tank. As such, the fluid level in the tank should, during blender operations, continue to rise when both pump systems are operating. As previously indicated at step 610, once the chemical additive fluid level in the tank has risen to a level above the second level associated with the second sensor, the chemical transfer pump is turned off. At this point, if the liquid additive pump is operating, it is allowed to continue to operate. Otherwise, the liquid additive pump is turned on, such as at 612. In either case, the speed of the liquid additive pump is controlled by a flowmeter positioned downstream of the liquid additive pump. With the chemical transfer pump turned off and the liquid additive pump turned on, the liquid level of the liquid additive in the tank will begin to fall.

At step 616, the second sensor is monitored to determine when the liquid additive liquid level falls below the second liquid level, at which point, as indicated at step 618, a timer is initiated. Once the timer has started, at step 620, the first sensor is monitored to determine, when the liquid additive liquid level falls below the first liquid level, at which point, as indicated at step 622, the timer is turned off. Using the measured time interval and the known volume of the tank between the first and second fluid levels, at step 624 a liquid additive flow rate is calculated.

At step 626, the calculated flow rate of liquid additive draining from the tank is compared to the measured flowrate from the flowmeter, and at step 628, it is determined if the difference between the measured flowrate and the calculated flowrate is above a predetermined tolerance range. If the delta or difference between the flow rates is outside of an acceptable tolerance range, then at step 630, the system switches to use of a tachometer.

In some embodiments, if the delta is outside of an acceptable range, then an operator may have the option to switch to use of a tachometer on the liquid additive pump to monitor the flow-rate thereafter. The tachometer may measure the revolutions per minute of the liquid additive pump. This measurement, multiplied by a known volume of chemical displacement per revolution of the liquid additive pump can be used to determine the flow-rate. The determination of the flow-rate based on the time it takes for the fluid level to reach the first sensor from the second sensor, which will be referred to as a bucket test, can be used to determine a calibration factor for the tachometer. In some embodiments, the operator may have to manually accept the new calibration based on the most recent bucket test. Even if the operator accepts the new calibration factor, the metering of the liquid additive pump may still be controlled by the flow-meter. Alternatively, other types of flow rate measurement systems may be utilized without departing from the spirit of the disclosure.

Moreover, the system continues to monitor the liquid level in the tank utilizing the first and second sensors as the chemical transfer pump(s) and liquid additive pump(s) are cycled on and off during the blending operations. Thereafter, the hydraulic fracturing fluid resulting from the blending operations can be injected into a wellbore in order to fracture the formation in which the wellbore is located.

While the foregoing system and methods have been described in terms of blender operations for hydraulic fracturing fluids, the system and methods may also be utilized at a hydrocarbon drilling and recovery site for similar wellbore operations, such as for mixing cement during completion operations or mixing drilling fluid during drilling operations. In the case of cementing operations, the cement prepared with the system and methods described herein can be pumped into a wellbore around casing to install the casing in the wellbore. In the case of drilling operations, the drilling fluid prepared with the system and methods described herein can be pumped into a drill string to assist in drilling operations or pumped into a wellbore to assist in wellbore fluid balancing operations. It will be appreciated that the term "liquid additive" as used herein may be any liquid utilized in the foregoing hydrocarbon drilling and recovery operations.

Thus, a pumping system has been described. Embodiments of the pumping system may generally include a method for controlling flow of a liquid additive from a holding tank in blending of hydraulic fracturing fluids at a wellsite. The method includes turning on a chemical transfer pump that pumps liquid additive into a holding tank if a fluid level of the liquid additive in the holding tank is below a first sensor level, turning off the chemical transfer pump if the fluid level of the liquid additive in the holding tank is above a second sensor level, utilizing a flowmeter to determine a measured flowrate of a liquid additive pump that pumps fluid from the holding tank to a blending apparatus that adds the liquid additive to hydraulic fracturing fluid, initiating a timing device when a decreasing fluid level in the holding tank falls below the second sensor level, stopping the timing device to yield a time interval when the fluid level of the liquid additive in the holding tank falls below the first sensor level, utilizing the time interval and a known volume of the holding tank between the first and second sensor levels to yield a calculated flowrate, and comparing the calculated flowrate to the measured flowrate.

Other embodiments of the pumping system may include a holding tank having a first sensor on a lower portion of the holding tank, and a second sensor on a higher portion of the holding tank. The system may further include a liquid additive pump to pump fluid from the holding tank to a blending apparatus that adds the fluid to a hydraulic fracturing fluid, and a chemical transfer pump to pump fluid into the holding tank in response to receiving a first signal that a fluid level of the holding tank is below the first sensor and cease to pump fluid into the holding tank in response to receiving a second signal from the second sensor indicating the fluid level is above the second sensor.

Other embodiments of the pumping system may include a control system for a fracturing fluid delivery system, the control system including a processor and a memory. The memory includes computer readable instructions stored thereon, that when executed by the processor, cause the system to receive a first signal from a first sensor near a bottom of a holding tank that gravity feeds liquid additive to a liquid additive pump that adds the liquid additive to a hydraulic fracturing fluid, turn on a chemical transfer pump in response to receiving the first signal, the chemical transfer pump in fluid connection with the holding tank, receive a second signal from a second sensor near a top of the holding tank and turn off the chemical transfer pump in response to receiving the second signal.

For any of the foregoing embodiments, the pumping system may include:

If the difference between a calculated flowrate and a measured flowrate is greater than a predetermined threshold, then switching to use of a tachometer of the liquid additive pump to measure the flowrate of the liquid additive pump.

Utilizing a flowmeter to control the speed of the liquid additive pump based on a desired flowrate.

A liquid additive is gravity fed from the holding tank to the liquid additive pump.

A control system to determine a volume of fluid within a holding tank by determining a time interval since a chemical transfer pump is turned off, determining a flow-rate of fluid out of the holding tank, and subtracting the flow-rate multiplied by the time interval from a known volume of fluid at a level of a second sensor.

A flow meter between a liquid additive pump and a fracturing tool.

A control system to validate a flow meter by determining a time interval between receiving a second signal and receiving a first signal and calculating a flow-rate by dividing a known volume between a first sensor and a second sensor by the time interval.

A chemical transfer pump comprises a solenoid valve to turn the chemical transfer pump on or off based on either a first signal or a second signal.

At least one of a first sensor and a second sensor comprise a frequency sensor.

A first sensor is placed at a volume level within a range of about 5% and 40% full and a second sensor is placed at a volume level within a range of about 60% to 95% full.

A graphical user interface to display to a user, a status of at least one of: a holding tank, a chemical transfer pump, and a liquid additive pump.

To determine a volume of fluid within a holding tank, a processor is further to determine a time interval since a chemical transfer pump is turned off, determine a flow-rate of fluid out of a holding tank, and subtract the flow-rate multiplied by the time interval from a known volume of fluid at a level of a second sensor.

To validate a flow meter, a processor is further to determine a time interval between receiving a second signal and receiving a first signal and calculate a flow-rate by dividing a known volume between the a sensor and a second sensor by the time interval.

A Graphical User Interface (GUI).

A GUI comprises an auto-fill feature that when activated, continuously causes a chemical transfer pump to switch on and off in response to a first signal and a second signal.

A GUI comprises an input mechanism to allow a user to input a level at which one of the sensors is placed.

A GUI comprises a display mechanism to provide a user with a status of at least one of: a holding tank and a chemical transfer pump.

A GUI comprises a mechanism for controlling and monitoring a holding tank and additional holding tanks.

Although various embodiments and methodologies have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for controlling flow of a liquid additive from a holding tank in blending of hydraulic fracturing fluids at a wellsite, the method comprising:
turning on a chemical transfer pump that pumps liquid additive into a holding tank if a fluid level of the liquid additive in the holding tank is below a first sensor level;
turning off the chemical transfer pump if the fluid level of the liquid additive in the holding tank is above a second sensor level;
utilizing a flowmeter to determine a measured flowrate of a liquid additive pump that pumps fluid from the holding tank to a blending apparatus that adds the liquid additive to hydraulic fracturing fluid;
initiating a timing device when a decreasing fluid level in the holding tank falls below the second sensor level;
stopping the timing device to yield a time interval when the fluid level of the liquid additive in the holding tank reaches the first sensor level;
utilizing the time interval and a known volume of the holding tank between the first and second sensor levels to yield a calculated flowrate; and
comparing the calculated flowrate to the measured flowrate.

2. The method of claim 1, further comprising, if the difference between the calculated flowrate and measured flowrate is greater than a predetermined threshold, then switching to use of a tachometer of the liquid additive pump to measure the flowrate of the liquid additive pump.

3. The method of claim 1, utilizing the flowmeter to control the speed of the liquid additive pump based on a desired flowrate.

4. The method of claim 1, wherein the liquid additive is gravity fed from the holding tank to the liquid additive pump.

5. A pumping system comprising:
a holding tank including:
a first sensor on a lower portion of the holding tank; and
a second sensor on a higher portion of the holding tank;
a liquid additive pump to pump fluid from the holding tank to a blending apparatus that adds the fluid to a hydraulic fracturing fluid;
a chemical transfer pump to:
pump fluid into the holding tank in response to receiving a first signal that a fluid level of the holding tank is below the first sensor; and
cease to pump fluid into the holding tank in response to receiving a second signal from the second sensor indicating the fluid level is above the second sensor and;
a control system to determine a volume of fluid within the holding tank by:
determining a first time interval since the chemical transfer pump is turned off;
determining a flow rate of fluid out of the holding tank; and
subtracting the flow-rate multiplied by the first time interval from a known volume of fluid at a level of the second sensor.

6. The system of claim 5, further comprising a fracturing tool coupled to the liquid additive pump and a flow meter between the liquid additive pump and the fracturing tool.

7. The system of claim 6, further comprising a control system to validate the flow meter by:
determining a second time interval between receiving the second signal and receiving the first signal; and
calculating a flow-rate by dividing a known volume between the first sensor and the second sensor by the second time interval.

8. The system of claim 5, wherein the chemical transfer pump comprises a solenoid valve to switch the chemical transfer pump on or off based on either the first signal or the second signal.

9. The system of claim 5, wherein at least one of the first sensor and the second sensor comprise a frequency sensor.

10. The system of claim 5, wherein the first sensor is placed at a volume level within a range of about 5% and 40% full and the second sensor is placed at a volume level within a range of about 60% to 95% full.

11. The system of claim 5, further comprising a graphical user interface to display to a user, a status of at least one: of the holding tank, the chemical transfer pump, and the liquid additive pump.

12. A control system for a fracturing fluid delivery system, the control system comprising:
a processor; and
a memory storing computer readable instructions that, when executed by the processor, cause the system to:
receive a first signal from a first sensor near a bottom of a holding tank that gravity feeds liquid additive to a liquid additive pump that adds the liquid additive to a hydraulic fracturing fluid;
turn on a chemical transfer pump in response to receiving the first signal, the chemical transfer pump in fluid connection with the holding tank;
receive a second signal from a second sensor near a top of the holding tank; and
turn off the chemical transfer pump in response to receiving the second signal;
determine a first time interval since the chemical transfer pump is turned off;
determine a flow-rate of fluid out of the holding tank; and
subtract the flow-rate multiplied by the first time interval from a known volume of fluid at a level of the second sensor.

13. The system of claim 12, wherein, to validate a flow meter, the processor is further to:
determine a second time interval between receiving the second signal and receiving the first signal; and
calculate a flow-rate by dividing a known volume between the first sensor and the second sensor by the second time interval.

14. The system of claim 12, further comprising a Graphical User Interface (GUI).

15. The system of claim 14, wherein the GUI comprises an auto-fill feature that when activated, continuously causes the chemical transfer pump to switch on and off in response to the first signal and the second signal.

16. The system of claim 14, wherein the GUI comprises sensor level feature operable to allow a user to input a sensor level.

17. The system of claim 14, wherein the GUI comprises at least one of a tank level status feature and a chemical transfer pump status feature operable to provide a user with a status of at least one of: the holding tank and the chemical transfer pump.

18. The system of claim 14, wherein the GUI comprises a select tank feature operable for controlling and monitoring the holding tank and additional holding tanks.

* * * * *